(12) United States Patent
Janoski et al.

(10) Patent No.: US 11,629,250 B2
(45) Date of Patent: *Apr. 18, 2023

(54) ACRYLIC POLYVINYL ACETAL FILMS AND COMPOSITION

(71) Applicant: 3M INNOVATIVE PROPERTIES COMPANY, St. Paul, MN (US)

(72) Inventors: Jonathan E. Janoski, Woodbury, MN (US); Anthony F. Schultz, Forest Lake, MN (US); Keith R. Lyon, Hudson, WI (US); Ronald S. Steelman, Woodbury, MN (US); Kevin M. Lewandowski, Inver Grove Heights, MN (US); Corinne E. Lipscomb, St. Paul, MN (US); Terry R. Hobbs, Lakeland, MN (US); Arlin L. Weikel, Roberts, WI (US); Jayshree Seth, Woodbury, MN (US); Duane D. Fansler, Dresser, WI (US); Hidetoshi Abe, Tendo (JP)

(73) Assignee: 3M Innovative Properties Company, St. Paul, MN (US)

( * ) Notice: Subject to any disclaimer, the term of this patent is extended or adjusted under 35 U.S.C. 154(b) by 273 days.

This patent is subject to a terminal disclaimer.

(21) Appl. No.: 16/952,159

(22) Filed: Nov. 19, 2020

(65) Prior Publication Data

US 2021/0070975 A1 Mar. 11, 2021

Related U.S. Application Data

(63) Continuation of application No. 16/202,281, filed on Nov. 28, 2018, now Pat. No. 10,870,750, which is a continuation of application No. 15/175,458, filed on Jun. 7, 2016, now Pat. No. 10,167,386, which is a continuation-in-part of application No. PCT/US2015/064215, filed on Jul. 12, 2015.

(60) Provisional application No. 62/088,945, filed on Dec. 8, 2014.

(51) Int. Cl.
| | |
|---|---|
| *C08L 29/14* | (2006.01) |
| *C08L 33/06* | (2006.01) |
| *C08L 33/08* | (2006.01) |
| *B32B 27/30* | (2006.01) |
| *B32B 27/08* | (2006.01) |
| *C08J 5/18* | (2006.01) |
| *C09J 7/22* | (2018.01) |
| *C09J 7/20* | (2018.01) |
| *C09D 133/08* | (2006.01) |
| *C09J 133/08* | (2006.01) |

(52) U.S. Cl.
CPC ............. *C08L 29/14* (2013.01); *B32B 27/08* (2013.01); *B32B 27/304* (2013.01); *B32B 27/306* (2013.01); *B32B 27/308* (2013.01); *C08J 5/18* (2013.01); *C08L 33/06* (2013.01); *C08L 33/08* (2013.01); *C09D 133/08* (2013.01); *C09J 7/201* (2018.01); *C09J 7/22* (2018.01); *B32B 2250/246* (2013.01); *B32B 2255/10* (2013.01); *B32B 2255/26* (2013.01); *B32B 2264/102* (2013.01); *B32B 2307/31* (2013.01); *B32B 2307/54* (2013.01); *B32B 2307/546* (2013.01); *B32B 2307/732* (2013.01); *C08J 2333/08* (2013.01); *C08J 2429/14* (2013.01); *C08L 2203/16* (2013.01); *C09J 133/08* (2013.01); *C09J 2433/00* (2013.01); *C09J 2433/005* (2013.01); *C09J 2467/005* (2013.01)

(58) Field of Classification Search
CPC ..... B32B 27/08; B32B 27/304; B32B 27/306; B32B 27/308; B32B 2255/10; B32B 2255/26; B32B 2307/732; C09J 2433/00; C09J 5/18; C08L 33/08

See application file for complete search history.

(56) References Cited

U.S. PATENT DOCUMENTS

| | | |
|---|---|---|
| 3,591,531 A | 7/1971 | Schroeder |
| 3,661,588 A | 5/1972 | Chang |
| 4,181,752 A | 1/1980 | Martens |
| 4,243,500 A | 1/1981 | Glennon |
| 4,330,590 A | 5/1982 | Vesley |
| 4,894,259 A | 1/1990 | Kuller |
| 5,102,731 A | 4/1992 | Takimoto |
| 5,246,785 A | 9/1993 | Matano |
| 5,506,279 A | 4/1996 | Babu |
| 5,902,836 A | 5/1999 | Bennett |

(Continued)

FOREIGN PATENT DOCUMENTS

| | | |
|---|---|---|
| CN | 103342968 | 6/2015 |
| DE | 102005023405 | 1/2007 |

(Continued)

OTHER PUBLICATIONS

B. Aran, M. Sankir, E. Vargun, N. D. Sankir, and A. Usanmaz; *Journal of Applied Polymer Science*, Wiley Periodicals, Inc., A Wiley Company, 2010, vol. 116, pp. 628-635.

(Continued)

*Primary Examiner* — Scott R. Walshon
(74) *Attorney, Agent, or Firm* — Carolyn A. Fischer

(57) ABSTRACT

A film is described comprising a (meth)acrylic polymer and a polyvinyl acetal (e.g. butyral) resin. In some embodiments, the film has a glass transition temperature (i.e. Tg) ranging from 30° C. to 60° C. In some embodiments, the film has a gel content of at least 20% or greater. In some embodiments, the film has an elongation at break of at least 175%. The film typically comprises photoinitiator as a result of the method by which the film was made. The film may be a monolithic film or a layer of a multilayer film.

20 Claims, No Drawings

(56) References Cited

U.S. PATENT DOCUMENTS

| | | |
|---|---|---|
| 6,200,666 B1 | 3/2001 | Christian |
| 6,576,396 B1 | 6/2003 | Leichsenring |
| 6,664,020 B1 | 12/2003 | Warner |
| 6,806,320 B2 | 10/2004 | Everaerts |
| 6,893,583 B2 | 5/2005 | Sakurai |
| 7,072,333 B2 | 7/2006 | Ahn |
| 7,385,020 B2 | 6/2008 | Anderson |
| 7,718,718 B2 | 5/2010 | Kanzawa |
| 8,372,517 B2 | 2/2013 | Tokuchi |
| 8,450,420 B2 | 5/2013 | Sakurai |
| 8,455,099 B2 | 6/2013 | Chevalier |
| 2003/0111519 A1 | 6/2003 | Kinney |
| 2003/0224150 A1 | 12/2003 | Ludwig |
| 2004/0253534 A1 | 12/2004 | Kidnie |
| 2004/0260020 A1 | 12/2004 | Miyake |
| 2005/0003222 A1 | 1/2005 | Everaerts |
| 2005/0130425 A1 | 6/2005 | Kanda |
| 2005/0181943 A1 | 8/2005 | Kidnie |
| 2010/0001540 A1 | 1/2010 | Tokuchi |
| 2010/0055418 A1 | 3/2010 | Takamatsu |
| 2011/0076613 A1 | 3/2011 | Yoshida |
| 2011/0112247 A1 | 5/2011 | Tokuchi |
| 2011/0282000 A1 | 11/2011 | Hayes |
| 2012/0003468 A1 | 1/2012 | Husemann |
| 2012/0231269 A1 | 9/2012 | Nakagawa |
| 2012/0288692 A1 | 11/2012 | Broyles |
| 2013/0004766 A1 | 1/2013 | Abe |
| 2014/0154505 A1 | 6/2014 | Steelman |
| 2014/0220306 A1 | 8/2014 | Uchida |
| 2015/0240067 A1 | 8/2015 | Nagai |

FOREIGN PATENT DOCUMENTS

| | | |
|---|---|---|
| EP | 447115 | 3/1991 |
| EP | 0411839 | 6/1991 |
| EP | 659844 | 12/1994 |
| EP | 0710545 | 5/1996 |
| EP | 0783550 | 7/1997 |
| EP | 0997750 | 5/2000 |
| EP | 1038665 | 9/2000 |
| EP | 2080786 | 7/2009 |
| EP | 2163571 | 3/2010 |
| EP | 2284221 | 2/2011 |
| EP | 2623525 | 8/2013 |
| EP | 2937733 | 10/2015 |
| JP | S641737 | 1/1989 |
| JP | H3-258544 | 11/1991 |
| JP | 5255390 | 10/1993 |
| JP | 09-324165 | 12/1997 |
| JP | 10-168271 | 6/1998 |
| JP | H10292013 | 11/1998 |
| JP | 2000-247014 | 9/2000 |
| JP | 2003-040653 | 2/2003 |
| JP | 2004-331413 | 11/2004 |
| JP | 2005-015654 | 1/2005 |
| JP | 2005-036054 | 2/2005 |
| JP | 2005-166012 | 6/2005 |
| JP | 2006-150965 | 6/2006 |
| JP | 2007-023145 | 2/2007 |
| JP | 2007-269995 | 10/2007 |
| JP | 2007-277050 | 10/2007 |
| JP | 2008-055690 | 3/2008 |
| JP | 2008-106254 | 5/2008 |
| JP | 2010-083909 | 9/2008 |
| JP | 2009-066896 | 4/2009 |
| JP | 2009-102467 | 5/2009 |
| JP | 2011-012127 | 1/2011 |
| JP | WO 2013/035839 | 3/2013 |
| JP | 2014-005192 | 1/2014 |
| JP | 2014-224234 | 4/2014 |
| JP | 2015-196754 | 11/2015 |
| KR | 0148852 | 10/1998 |
| WO | WO 2003/012459 | 2/2003 |
| WO | WO 2005/023913 | 3/2005 |
| WO | WO 2005/058594 | 6/2005 |
| WO | WO 2006/094177 | 9/2006 |
| WO | WO 2009/041017 | 4/2009 |
| WO | WO 2009/146227 | 12/2009 |
| WO | WO 2010/078346 | 7/2010 |
| WO | WO 2011/042665 | 4/2011 |
| WO | WO 2012/069587 | 5/2012 |
| WO | WO 2012-132115 | 10/2012 |
| WO | WO 2013/019699 | 2/2013 |
| WO | WO 2013/019706 | 2/2013 |
| WO | WO 2013-019766 | 2/2013 |
| WO | WO 2014/050746 | 3/2014 |
| WO | WO 2014/156214 | 10/2014 |
| WO | WO 2014/172185 | 10/2014 |
| WO | WO 2015/064219 | 5/2015 |
| WO | WO 2015/157350 | 10/2015 |
| WO | WO 2016/094112 | 6/2016 |
| WO | WO 2016/094277 | 6/2016 |
| WO | WO 20160/94280 | 6/2016 |
| WO | WO 2017/112453 | 6/2017 |
| WO | WO 2017/112458 | 6/2017 |
| WO | WO 2017/112468 | 6/2017 |
| WO | WO 2017/112537 | 6/2017 |
| WO | WO 2017214007 | 12/2017 |

OTHER PUBLICATIONS

Butvar Polyvinyl Butyra Resin Properties and Uses, © Solutia Inc., 2006, p. 1-32.

Eastman, Product Data Sheet, "Tenite™ Propionate 307E4000018 Clear, Trsp", 2000 [retrieved from the internet on May 25, 2017], URL <http://ws.eastman.com/ProductCatalogApps/PageControllers/ProdDatasheet_PC.aspx?Pro>, pp. 1-2.

I. Sideridou-Karayannidou and G. Seretoudi, *Polymer*, vol. 40, Issue 17, 1999, pp. 4915-4922, Abstract Only.

International Search Report for PCT International Application No. PCT/US2015/064215, dated Mar. 18, 2016, 5 pages.

International Search Report for PCT International Application No. PCT/US2015/064219, dated Mar. 18, 2016, 4 pages.

International Search Report for PCT International Application No. PCT/US2015/063073, dated Feb. 26, 2016, 4 pages.

"Intro in Properties And Applications," Specialized in Specialties, KSE ®Mowital p. 1-84.

Pocius, Adhesion and Adhesive Technology $3^{rd}$ Ed., 2012, pp. 287-291.

"Polyvinyl Butyral of Superior Quality," Kuraray Specialties Europe GmbH, ®Mowital, 2003, p. 1-36.

Kuraray ®Mowital ®Pioloform, Technical Data Sheet, p. 1-2.

Wakabayashi, "Studies on s—Triazines. I. Contrimerization of Trichloroacetonitrile With Other Nitriles," Bulletin of the Chemical Society of Japan, 1969, vol. 42, pp. 2924-2930.

Tripathy et al., Novel Poly(butylene terephthalate)/Poly(vinyl butyral) Blends Prepared by in situ Polymerization of Cyclic Poly( butene terephthalate) oligomers, Polymer vol. 44 pp. 1835-1842 (2003) (Year: 2003).

ACRYLIC POLYVINYL ACETAL FILMS AND COMPOSITION

CROSS REFERENCE TO RELATED APPLICATIONS

This application is a continuation of U.S. application Ser. No. 16/202,281, filed Nov. 28, 2018, which is a continuation of U.S. patent Ser. No. 10/167,386, issued Jan. 1, 2019, which is a continuation-in-part of International Application PCT/US2015/064215, filed Jul. 12, 2015, which claims the benefit of U.S. Provisional Patent Application No. 62/088,945, filed Dec. 8, 2014, which is incorporated herein by reference in its entirety.

SUMMARY

In one embodiment, a film is described. The film comprises a single phase of (meth)acrylic polymer and a polyvinyl acetal resin. The polyvinyl acetal resin comprises polymerized units having the formula

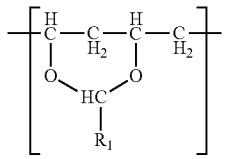

wherein $R_1$ is hydrogen or a C1-C7 alkyl group. In one embodiment, the film has a glass transition temperature (i.e. Tg) ranging from 30° C. to 60° C. In another embodiment, the film has gel content of at least 20%. In another embodiment, the film has an elongation at break of at least 175%. The film typically comprises photoinitiator as a result of the method by which the film was made. The film may be a monolithic film or a (e.g. exterior) layer of a multilayer film.

In another embodiment, a method of making a film is described. The method comprises providing a composition comprising polyvinyl acetal resin and free-radically polymerizable solvent monomer. The method comprises applying the composition to a substrate (e.g. release liner); polymerizing the solvent monomer; and optionally crosslinking the composition thereby forming a film. The polyvinyl acetal resin and types and amounts of free-radically polymerizable solvent monomer are selected such that the cured composition has a Tg ranging from 30° C. to 60° C.

In yet another embodiment, a composition is described comprising a (meth)acrylic polymer and a polyvinyl acetal resin. The composition preferably has a Tg ranging from 30° C. to 60° C.

In favored embodiments, the film and/or (e.g. radiation) polymerized and optionally cured composition exhibits a suitable balance of (e.g. Tg, tensile, and/or elongation) properties such that it can be utilized as a replacement for polyvinyl chloride films or other types of (e.g. flexible) films.

DETAILED DESCRIPTION

Presently described are films and compositions comprising a (meth)acrylic polymer and polyvinyl acetal resin, as well as methods of making. The composition is preferably prepared by dissolving polyvinyl acetal resin in a free-radically polymerizable solvent monomer. The solvent monomer is preferably polymerized by exposure to (e.g. ultraviolet) radiation.

The film and composition comprises polymerized units of one or more (meth)acrylate ester monomers derived from a (e.g. non-tertiary) alcohol containing 1 to 14 carbon atoms and preferably an average of 4 to 12 carbon atoms.

Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol; 3,5,5-trimethyl-1-hexanol, 3-heptanol, 1-octanol, 2-octanol, isooctyl-alcohol, 2-ethyl-1-hexanol, 1-decanol, 2-propylheptanol, 1-dodecanol, 1-tridecanol, 1-tetradecanol, and the like.

The film and composition comprises polymerized units of one or more low Tg (meth)acrylate monomers, i.e. a (meth)acrylate monomer when reacted to form a homopolymer has a $T_g$ no greater than 0° C. In some embodiments, the low Tg monomer has a $T_g$ no greater than −5° C., or no greater than −10° C. The Tg of these homopolymers is often greater than or equal to −80° C., greater than or equal to −70° C., greater than or equal to −60° C., or greater than or equal to −50° C.

The low Tg monomer may have the formula

wherein $R^1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate (Tg=−70° C.), isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, but are not limited to, 2-methoxyethyl acrylate and 2-ethoxyethyl acrylate.

In some embodiments, the film and composition comprises polymerized units of at least one low Tg monomer(s) having an alkyl group with 6 to 20 carbon atoms. In some embodiments, the low Tg monomer has an alkyl group with 7 or 8 carbon atoms. Exemplary monomers include, but are not limited to, 2-ethylhexyl (meth)acrylate, isooctyl (meth)acrylate, n-octyl (meth)acrylate, 2-octyl (meth)acrylate, isodecyl (meth)acrylate, and lauryl (meth)acrylate.

In some embodiments, the monomer is an ester of (meth)acrylic acid with an alcohol derived from a renewable source. A suitable technique for determining whether a material is derived from a renewable resource is through organic radiocarbon ($^{14}C$) analysis according to ASTM D6866-10, as described in US2012/0288692. The application of ASTM D6866-10 to derive a "bio-based content" is built on the same concepts as radiocarbon dating, but without use of the age equations. The analysis is performed by deriving a ratio of the amount of organic radiocarbon ($^{14}C$) in an unknown sample to that of a modern reference standard. The ratio is reported as a percentage with the units "pMC" (percent modern carbon).

One suitable monomer derived from a renewable source is 2-octyl (meth)acrylate, as can be prepared by conventional techniques from 2-octanol and (meth)acryloyl derivatives such as esters, acids and acyl halides. The 2-octanol may be prepared by treatment of ricinoleic acid, derived from castor oil, (or ester or acyl halide thereof) with sodium hydroxide, followed by distillation from the co-product sebacic acid. Other (meth)acrylate ester monomers that can be renewable are those derived from ethanol and 2-methyl butanol. In some embodiments, the film and composition comprises a bio-based content of at least 10, 15, 20, 25, 30, 35, 40, 45, 50, 55 or 60 wt.-% using ASTM D6866-10, method B.

The film and composition typically comprises at least 10, 15, 20 or 25 wt.-% of polymerized units of monofunctional alkyl (meth)acrylate low Tg monomer (e.g. having a Tg of less than 0° C.), based on the total weight of the polymerized units (i.e. excluding inorganic filler or other additives). As used herein, wt.-% of polymerized units refers to the wt.-% based on the total weight of the (meth)acrylic polymer, polyvinyl acetal (e.g. butyral) resin, and crosslinker when present. The film and composition typically comprises no greater than 60, 55, 50, 45, or 40 wt.-% of polymerized units of monofunctional alkyl (meth)acrylate monomer having a Tg of less than 0° C., based on the total weight of the polymerized units.

When the film or composition is free of unpolymerized components such as inorganic filler and additives, the wt.-% of specified polymerized units is approximately the same as the wt.-% of such polymerized units present in the total composition. However, when the composition comprises unpolymerized components, such as inorganic filler or other unpolymerizable additives, the total composition can comprise substantially less polymerized units. In general, the total amount of unpolymerizable additives may range up to 25 wt.-%. Thus, in the case of films and composition comprising such unpolymerizable additives the concentration of specified polymerized units can be as much as 5, 10, 15, 20, 25 wt.-% less, depending on the total concentration of such additives. For example, when the film or composition comprises 20 wt.-% inorganic filler, the concentration of low Tg monofunctional alkyl (meth)acrylate monomer may be 20% less, i.e. at least 8 wt.-%, 12 wt.-% etc.

The film and composition generally comprise at least one (e.g. non-polar) high Tg monomer, i.e. a (meth)acrylate monomer when reacted to form a homopolymer has a Tg greater than 0° C. The high Tg monomer more typically has a Tg greater than 5° C., 10° C., 15° C., 20° C., 25° C., 30° C., 35° C., or 40° C.

In typical embodiments, the film and composition comprises at least one high Tg monofunctional alkyl (meth) acrylate monomers including for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, and propyl methacrylate or combinations.

In some embodiments, the film and composition comprises at least 1, 2, or 3 wt.-% up to 35 or 40 wt.-% of polymerized units of a monofunctional alkyl (meth)acrylate monomer having a Tg greater than 40° C., 50° C., 60° C., 70° C., or 80° C. based on the total weight of the polymerized units (i.e. excluding inorganic filler or other additives). In some embodiments, the film and composition comprises no greater than 30, 25, 20, or 10 wt.-% of polymerized units of high Tg monofunctional alkyl (meth) acrylate monomer. Further, in some embodiments, the film and composition comprises less than 1.0, 0.5, 0.1 wt.-% or is free of polymerized units of high Tg monofunctional alkyl (meth)acrylate monomer.

The Tg of the homopolymer of various monomers is known and is reported in various handbooks. The following table sets forth the Tg of some illustrative monomers as reported (unless specified otherwise) in *Polymer Handbook*, 4$^{th}$ edition, edited by J. Brandrup, E. H. Immergut, and E. A. Grulke, associate editors A. Abe and D. R. Bloch, J. Wiley and Sons, New York, 1999.

| Glass Transition Temperature (Tg) of the Homopolymer of Monomers | | | |
|---|---|---|---|
| | Tg, °C. | | Tg, °C. |
| Methyl methacrylate | 105 | Methacrylic acid | 223 |
| Isobutyl methacrylate | 53 | 2-hydroxyethyl acrylate | 4 (b) |
| Hexyl methacrylate | −5 | 2-hydroxyethyl methacrylate | 85 |
| Methyl acrylate | 10 | N-vinyl carbazole | 212 (a) |
| Butyl acrylate | −54 | N,N-dimethyl acrylamide | 89 |
| 2-octyl acrylate | −45 | N-vinyl pyrrolidone | 54 |
| 2-ethylhexyl acrylate | −50 | N,N-Dimethylamino ethyl acrylate | −39 (a) |
| Isobornyl acrylate | 94 | N,N-Dimethylamino ethyl methacrylate | 19 |
| Acrylic acid | 106 | | |

(a) I. Sideridou-Karayannidou and G. Seretoudi, *Polymer*, Vol. 40, Issue 17, 1999, pp. 4915-4922.
(b) B. Aran, M. Sankir, E. Vargun, N. D. Sankir, and A. Usanmaz; *Journal of Applied Polymer Science*, Wiley Periodicals, Inc., A Wiley Company, 2010, Vol. 116, pp. 628-635.

In typical embodiments, the film and composition further comprises at least 10, 15 or 20 wt.-% and no greater than 65 wt.-% of polymerized units of polar monomers. Such polar monomers generally aids in compatibilizing the polyvinyl acetal (e.g. butyral) resin with the high and low Tg alkyl (meth)acrylate (e.g. solvent) monomers. The polar monomers typically have a Tg greater than 0° C., yet the Tg may be less than the high Tg monofunctional alkyl (meth) acrylate monomer.

Representative polar monomers include for example acid-functional monomers, hydroxyl functional monomers, nitrogen-containing monomers, and combinations thereof.

In some embodiments, the film and composition comprises polymerized units of an acid functional monomer (a subset of high Tg monomers), where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. In some embodiments, the film and composition comprises 0.5 up to 20 or 25 wt.-% of polymerized units of acid functional monomers, such as acrylic acid. In some embodiments, the film and composition comprises at least 1, 2, 3, 4, or 5 wt.-% of polymerized units of acid-functional monomers. In other embodiments, the film and composition comprises less than 1.0, 0.5, 0.1 wt.-% or is free of polymerized units of acid-functional monomers.

In some embodiments, the film and composition comprises non-acid-functional polar monomer.

One class of non-acid-functional polar monomers includes nitrogen-containing monomers. Representative examples include N-vinylpyrrolidone; N-vinylcaprolactam; acrylamide; mono- or di-N-alkyl substituted acrylamide; t-butyl acrylamide; dimethylaminoethyl acrylamide; and N-octyl acrylamide. In some embodiments, the film and composition comprises at least 0.5, 1, 2, 3, 4, or 5 wt.-% of polymerized units of nitrogen-containing monomers and typically no greater than 25 or 30 wt.-%. In other embodiments, the film and composition comprises less than 1.0, 0.5, 0.1 wt.-% or is free of polymerized units of nitrogen-containing monomers.

Another class of non-acid-functional polar monomers includes alkoxy-functional (meth)acrylate monomers. Representative examples 2-(2-ethoxyethoxy)ethyl (meth)acrylate, 2-ethoxyethyl (meth)acrylate, 2-hydroxyethyl (meth)acrylate, 2-(methoxyethoxy)ethyl, 2-methoxyethyl methacrylate, and polyethylene glycol mono(meth)acrylates.

In some embodiments, the film and composition comprises at least 0.5, 1, 2, 3, 4, or 5 wt.-% of polymerized units of alkoxy-functional (meth)acrylate monomers and typically no greater than 30 or 35 wt.-%. In other embodiments, the film and composition comprises less than 1.0, 0.5, 0.1 wt.-% or is free of polymerized units of alkoxy-functional (meth)acrylate monomers.

Preferred polar monomers include acrylic acid, 2-hydroxyethyl (meth)acrylate; N,N-dimethyl acrylamide and N-vinylpyrrolidinone. The film and composition generally comprises polymerized units of polar monomer in an amount of at least 10, 15 or 20 wt.-% and typically no greater than 65, 60, 55, 50 or 45 wt.-%.

The film and composition may optionally comprise vinyl monomers including vinyl esters (e.g., vinyl acetate and vinyl propionate), styrene, substituted styrene (e.g., α-methyl styrene), vinyl halide, and mixtures thereof. As used herein vinyl monomers are exclusive of polar monomers. In some embodiments, the film and composition comprises at least 0.5, 1, 2, 3, 4, or 5 wt.-% and typically no greater than 10 wt.-% of polymerized units of vinyl monomers. In other embodiments, the film and composition comprises less than 1.0, 0.5, 0.1 wt.-% or is free of polymerized units of vinyl monomers.

In some favored embodiments, the polymerized units of the (meth)acrylic polymer contain aliphatic groups and lack aromatic moieties.

In typical embodiments, the (e.g. solvent) monomer(s) are polymerized to form a random (meth)acrylic polymer copolymer.

The polyvinyl acetal resin utilized in the present invention is obtained, for example, by reacting polyvinyl alcohol with aldehyde, as known in the art.

Polyvinyl alcohol resins are not limited by the production method. For example, those produced by saponifying polyvinyl acetate and the like with alkali, acid, ammonia water, and the like, can be used. Polyvinyl alcohol resins may be either completely saponified or partially saponified. It is preferable to use those having a saponification degree of 80 mol % or more. The polyvinyl alcohol resins may be used singly or in combination of two or more.

Aldehydes used in the production of the polyvinyl acetal resin include formaldehyde (including paraformaldehyde), acetaldehyde (including paraacetaldehyde), propionaldehyde, butyraldehyde, n-octylaldehyde, amylaldehyde, hexylaldehyde, heptylaldehyde, 2-ethylhexylaldehyde, cyclohexylaldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, β-phenylpropionaldehyde, and the like. These aldehydes may be used singly or in combination of two or more.

The polyvinyl acetal resin generally has repeating units represented by Chemical Formula 1.

[Chemical Formula 1]

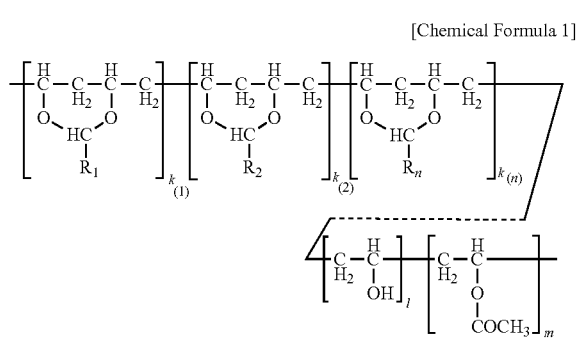

In Chemical Formula 1, n is the number of different types of aldehyde used in acetalization; $R_1$, $R_2$, ..., $R_n$, are independently a (e.g. C1-C7) alkyl residue of aldehyde used in the acetalization reaction, or a hydrogen atom; $k_1$, $k_2$, ..., $k_n$ are independently the proportion of each acetal unit containing $R_1$, $R_2$, ..., $R_n$, (molar ratio); l is the proportion of vinyl alcohol units (molar ratio); and m is the proportion of vinyl acetate units (molar ratio). The sum of $k_1+k_2+...+k_n+l+m=1$. Further at least one of $k_1$, $k_2$, ..., $k_n$ may not be zero. When a single type of aldehyde is utilized in the preparation of the polyvinyl acetal resin, such single aldehyde may be represented by $k_1$. The number of repeat units of $k_1+l+m$ is sufficient to provide the desired molecular weight. In this embodiment, $k_2$ and $k_n$ may be zero. The polyacetal resin is typically a random copolymer. However, block copolymers and tapered block copolymers may provide similar benefits as random copolymers.

The content of polyvinyl acetal (e.g. butyral) typically ranges from 65 wt-% up to 90 wt-% of the polyvinyl acetal (e.g. butyral) resin. In some embodiments, the content of polyvinyl acetal (e.g. butyral) ranges from about 70 or 75 up to 80 or 85 wt-%. Thus, the number of repeat units of "$k_1$, $k_2$, ..., $k_n$," are selected accordingly.

The content of polyvinyl alcohol typically ranges from about 10 to 30 wt-% of the polyvinyl acetal (e.g. butyral) resin. In some embodiments, the content of polyvinyl alcohol ranges from about 15 to 25 wt-%. Thus, "l" is selected accordingly.

The content of polyvinyl acetate can be zero or range from 1 to 8 wt.-% of the polyvinyl acetal (e.g. butyral) resin. In some embodiments, the content of polyvinyl acetate ranges from about 1 to 5 wt.-%. Thus, "m" is selected accordingly.

In some embodiments, the alkyl residue of aldehyde comprises 1 to 7 carbon atoms. In other embodiments, the alkyl reside of the aldehyde comprises 3 to 7 carbon atoms such as in the case of butylaldehyde ($R_1$=3), hexylaldehyde ($R_1$=5), n-octylaldehyde ($R_1$=7). Of these butylaldehyde, also known as butanal is most commonly utilized. Polyvinyl butyral ("PVB") resin is commercially available from Kuraray under the trade designation "Mowital™" and Solutia under the trade designation "Butvar™".

In some embodiments, the polyvinyl acetal (e.g. butyral) resin has a Tg ranging from about 60° C. up to about 75° C. or 80° C. In some embodiments, the Tg of the polyvinyl acetal (e.g. butyral) resin is at least 65 or 70° C. When other aldehydes, such as n-octyl aldehyde, are used in the preparation of the polyvinyl acetal resin, the Tg may be less than 65° C. or 60° C. The Tg of the polyvinyl acetal resin is typically at least 35, 40 or 45° C. When the polyvinyl acetal resin has a Tg of less than 60° C., higher concentrations of high Tg monomers may be employed in the film and (e.g. exemplified) composition in comparison to those utilizing polyvinyl butyral resin. When other aldehydes, such as acetaldehyde, are used in the preparation of the polyvinyl acetal resin, the Tg may be greater than 75° C. or 80° C. When the polyvinyl acetal resin has a Tg of greater than 70° C., higher concentrations of low Tg monomers may be employed in the film and (e.g. exemplified) composition in comparison to those utilizing polyvinyl butyral resin.

The polyvinyl acetal (e.g. PVB) resin typically has an average molecular weight (Mw) of at least 10,000 g/mole or 15,000 g/mole and no greater than 150,000 g/mole or 100,000 g/mole. In some favored embodiments, the polyacetal (e.g. PVB) resin has an average molecular weight (Mw) of at least 20,000 g/mole; 25,000; 30,000, 35,000 g/mole and typically no greater than 75,000 g/mole.

The film and composition comprises 5 to 30 wt.-% of polyvinyl acetal resin such as polyvinyl butyral based on the total weight of the polymerized units of the (meth)acrylate polymer, polyvinyl acetal (e.g. butyral) resin, and crosslinker when present. In some embodiments, the film and composition comprises at least 10, 11, 12, 13, 14, or 15 wt.-% of polyvinyl acetal (e.g. PVB) resin. In some embodiments, the film and composition comprises no greater than 25 or 20 wt-% of polyvinyl acetal (e.g. PVB) resin. When the film and composition comprises a polyvinyl acetal (e.g. PVB) resin having an average molecular weight (Mw) less than 50,000 g/mole, the film and composition may comprise higher concentration polyvinyl acetal (e.g. PVB) resin such as 35 or 40 wt.-%. Thus, the film and composition comprises a minor amount of polyvinyl acetal (e.g. PVB) resin in combination with a major amount of (meth)acrylic polymer. The amount of (meth)acrylic polymer is typically at least 50, 55, 60, 65, 70, 75, 80, 85, 90, or 95 wt.-% of the film.

In some embodiments, the film and composition comprises a crosslinker. In some embodiments, the crosslinker is a multifunctional crosslinker capable of crosslinking polymerized units of the (meth)acrylic polymer such as in the case of crosslinkers comprising functional groups selected from (meth)acrylate, vinyl, and alkenyl (e.g. C3-C80 olefin groups); as well as chlorinated triazine crosslinking compounds.

Examples of useful (e.g. aliphatic) multifunctional (meth)acrylate include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof.

In one embodiment, the crosslinking monomer comprises a (meth)acrylate group and an olefin group. The olefin group comprises at least one hydrocarbon unsaturation. The crosslinking monomer may have the formula

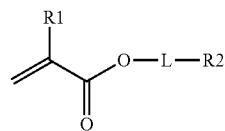

R1 is H or CH$_3$,
L is an optional linking group; and
R2 is an olefin group, the olefin group being optionally substituted.

Dihydrocyclopentadienyl acrylate is one example of this class of crosslinking monomer. Other crosslinking monomers of this type comprising a C$_6$-C$_{20}$ olefin are described in WO2014/172185.

In other embodiments, the crosslinking monomer comprises at least two terminal groups selected from allyl, methallyl, or combinations thereof. An allyl group has the structural formula H$_2$C=CH—CH$_2$—. It consists of a methylene bridge (—CH$_2$—) attached to a vinyl group (—CH=CH$_2$). Similarly, a methallyl group is a substituent with the structural formula H$_2$C=C(CH$_3$)—CH$_2$—. The terminology (meth)allyl includes both allyl and methallyl groups. Crosslinking monomers of this types are described in PCT Publication WO2015/157350.

In some embodiments, the film and composition may comprise a multifunctional crosslinker comprising vinyl groups, such as in the case of 1,3-divinyl tetramethyl disiloxane.

The triazine crosslinking compound may have the formula.

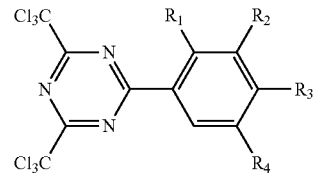

wherein R$_1$, R$_2$, R$_3$ and R$_4$ of this triazine crosslinking agent are independently hydrogen or alkoxy group, and 1 to 3 of R$_1$, R$_2$, R$_3$ and R$_4$ are hydrogen. The alkoxy groups typically have no greater than 12 carbon atoms. In favored embodiments, the alkoxy groups are independently methoxy or ethoxy. One representative species is 2,4,-bis(trichloromethyl)-6-(3,4-bis(methoxy)phenyl)-triazine. Such triazine crosslinking compounds are further described in U.S. Pat. No. 4,330,590.

In other embodiments, the crosslinker comprises hydroxyl-reactive groups, such as isocyanate groups, capable of crosslinking alkoxy group of the (meth)acrylic polymer (e.g. HEA) or polyvinyl alcohol groups of the polyvinyl acetal (PVB). Examples of useful (e.g. aliphatic) multifunctional isocyanate crosslinkers include hexamethylene diisocyanate, isophorone diisocyanate, as well as derivatives and prepolymers thereof.

Various combinations of two or more of crosslinkers may be employed.

When present, the crosslinker is typically present in an amount of at least 0.5, 1.0, 1.5, or 2 wt-% ranging up to 5 or 10 wt-% based on the total weight of the polymerized units of the (meth)acrylate polymer, polyvinyl acetal (e.g. butyral) resin, and crosslinker. Thus the film and composition comprise such amount of polymerized crosslinker units.

The composition can be polymerized by various techniques, yet is preferably polymerized by solventless radiation polymerization, including processes using electron beam, gamma, and especially ultraviolet light radiation. In this (e.g. ultraviolet light radiation) embodiment, generally little or no methacrylate monomers are utilized. Thus, the film and composition comprises zero or no greater than 10, 9, 8, 7, 6, 5, 4, 3, 2, or 1 wt-% of polymerized units of monomer having a methacrylate group. One method of preparing the film and composition described herein comprises dissolving the polyvinyl acetal (e.g. PVB) polymer resin in the unpolymerized solvent monomer(s) of the (meth)acrylic polymer forming a coatable composition of sufficient viscosity.

Another method includes partially polymerizing the solvent monomer(s) to produce a syrup composition comprising a solute (meth)acrylic polymer dissolved in unpolymerized solvent monomer(s). The unpolymerized solvent monomer(s) typically comprise the same monomer(s) as utilized to produce the solute (meth)acrylic polymer. If some of the monomers were consumed during the polymerization of the (meth)acrylic polymer, the unpolymerized solvent monomer(s) comprises at least some of the same monomer(s) as utilized to produce the solute (meth)acrylic polymer. Further, the same monomer(s) or other monomer(s) can be added to the syrup once the (meth) acrylic polymer has been formed. Partial polymerization provides a coatable solution of the (meth)acrylic solute polymer in one or more free-radically polymerizable solvent monomers.

A preferred method of preparation of the syrup composition is photoinitiated free radical polymerization.

The polyvinyl acetal (e.g. PVB) polymer can be added prior to and/or after partial polymerization of monomer(s) of the (meth)acrylic polymer. In this embodiment, the coating composition comprises partially polymerized (e.g. alkyl (meth)acrylate) solvent monomers and polyvinyl acetal (e.g. PVB) polymer resin. The coatable composition is then coated on a suitable substrate and further polymerized.

The viscosity of the coatable composition is typically at least 1,000 or 2,000 cps ranging up to 100,000 cps at 25° C. In some embodiments, the viscosity is no greater than 75,000; 50,000, or 25,000 cps. The coatable composition is coated on a suitable substrate such as a release liner, and polymerized by exposure to radiation.

The method can form a higher molecular weight (meth) acrylic polymer than can be used by solvent blending a prepolymerized (meth)acrylic polymer and polyvinyl acetal (e.g. PVB) polymer. Higher molecular weight (meth)acrylic polymer can increase the amount of chain entanglements, thus increasing cohesive strength. Also, the distance between crosslinks can be greater with a high molecular (meth)acrylic polymer, which allows for increased wet-out onto a surface of an adjacent (e.g. film) layer.

The molecular weight of the composition can be increased even further by the inclusion of crosslinker.

The high molecular weight (meth)acrylic polymer as well as the composition and film typically has a gel content (as measured according to the Gel Content Test Method described in the examples utilizing tetrahydrofuran (THF) of at least 20, 25 30, 35, or 40%. In some embodiments, the gel content is at least 45, 50, 55, 60, 65, 70, 75, 80, 85, 90, or 95%. The gel content is typically less than 100%, 99%, or 98%. When the (meth)acrylic polymer has a high gel content, it is typically not thermoplastic.

The polymerization is preferably conducted in the absence of unpolymerizable organic solvents such as ethyl acetate, toluene and tetrahydrofuran, which are non-reactive with the functional groups of the solvent monomer and polyvinyl (e.g. PVB) acetal. Solvents influence the rate of incorporation of different monomers in the polymer chain and generally lead to lower molecular weights as the polymers gel or precipitate from solution. Thus, the film and compositions can be free of unpolymerizable organic solvent.

Useful photoinitiators include benzoin ethers such as benzoin methyl ether and benzoin isopropyl ether; substituted acetophenones such as 2,2-dimethoxy-2-phenylacetophenone photoinitiator, available the trade name IRGACURE 651 or ESACURE KB-1 photoinitiator (Sartomer Co., West Chester, Pa.), and dimethylhydroxyacetophenone; substituted α-ketols such as 2-methyl-2-hydroxy propiophenone; aromatic sulfonyl chlorides such as 2-naphthalenesulfonyl chloride; and photoactive oximes such as 1-phenyl-1,2-propanedione-2-(O-ethoxy-carbonyl)oxime.

Particularly preferred among these are the substituted acetophenones.

Preferred photoinitiators are photoactive compounds that undergo a Norrish I cleavage to generate free radicals that can initiate by addition to the acrylic double bonds. The photoinitiator can be added to the mixture to be coated after the polymer (e.g. syrup) has been formed, i.e., photoinitiator can be added to the composition. Such polymerizable photoinitiators are described, for example, in U.S. Pat. Nos. 5,902,836 and 5,506,279 (Gaddam et al.).

Such photoinitiators are typically present in an amount of from 0.1 to 1.0 wt-%. Relatively thick coatings can be achieved when the extinction coefficient of the photoinitiator is low.

The compositions can be coated on a release liner using conventional coating techniques. For example, these compositions can be applied by methods such as roller coating, flow coating, dip coating, spin coating, spray coating knife coating, and die coating. Coating thicknesses may vary. The composition may be of any desirable concentration for subsequent coating, but is typically 5 to 30, 35 or 40 wt-% polyvinyl acetal polymer solids in (meth)acrylic solvent monomer. The desired concentration may be achieved by further dilution of the coating composition. The coating thickness may vary depending on the desired thickness of the (e.g. radiation) cured film.

The composition and the photoinitiator may be irradiated with activating UV radiation to polymerize the monomer component(s). UV light sources can be of various types including relatively low light intensity sources such as blacklights, which provide generally 10 mW/cm$^2$ or less (as measured in accordance with procedures approved by the United States National Institute of Standards and Technology as, for example, with a UVIMAP UM 365 L-S radiometer manufactured by Electronic Instrumentation & Technology, Inc., in Sterling, Va.) over a wavelength range of 280 to 400 nanometers; and relatively high light intensity sources such as medium pressure mercury lamps which provide intensities generally greater than 10 mW/cm$^2$, preferably 15 to 450 mW/cm$^2$. Intensities can range from 0.1 to 150 mW/cm$^2$, preferably from 0.5 to 100 mW/cm$^2$, and more preferably from 0.5 to 50 mW/cm$^2$. The monomer component(s) can also be polymerized with high intensity light sources as available from Fusion UV Systems Inc. UV light to polymerize the monomer component(s) can be provided by light emitting diodes, blacklights, medium pressure mercury lamps, etc. or a combination thereof.

When the film is a monolithic film, the thickness of the (e.g. radiation) cured film is typically at least 10, 15, 20, or 25 microns (1 mil) to 500 microns (20 mils) thickness. In some embodiments, the thickness of the (e.g. radiation) cured film is no greater than 400, 300, 200, or 100 microns. When the film is a film layer of a multilayer film, the multilayer film typically has the thickness just described. However, the thickness of the film layer comprising the (meth)acrylic polymer and polyvinyl acetal, as described herein, may be less than 10 microns.

In one embodiment, the film layer comprising the (meth) acrylic polymer and polyvinyl acetal resin as an exterior layer or in other words a skin layer. A second film layer is disposed upon the skin layer. The second film layer typically has a different composition than the skin layer. In one embodiment, the second film layer comprises a (e.g. radiation) cured layer comprising a (meth)acrylic polymer and polyvinyl acetal. However, the second film layer has a Tg less than 30° C., 25° C. or 20° C. The second film layer may have improved thermal forming, thermal laminating, or thermal bonding properties relative to the skin layer. Suitable second film layers include those described in "Acrylic Polyvinyl Acetal Films, Compositions, and Heat Bondable Articles", U.S. Application No. 62/088,963, PCT/US2015/064219; incorporated herein by reference.

In some embodiments, the thickness of the film may range up to 50, 100, or 150 mils. The (e.g. radiation) cured film may be in the form of individual sheets, particularly for a thickness of greater than 20 mils. The (e.g. thinner) cured film may be in the form of a roll-good.

In some embodiments, the film, film layer, as well as the composition of (meth)acrylic polymer, polyvinyl acetal (e.g. butyral), and crosslinker when present is transparent having a transmission of visible light of at least 90, 91, 92, 93, 94, or 95% as measured according to the test method described in the examples. In some embodiments, the clarity is at least 90, 91, 92, 93, 94, or 95%. The transmission and clarity are typically less than 100%. In some embodiments, the haze is less than 15% or 10%. In some embodiments, the haze is less than 9, 8, 7, 6, 5, 4, 3, or 2%. The haze may be at least 0.5%.

The composition and film may optionally contain one or more conventional additives. Additives include, for example, antioxidants, stabilizers, ultraviolet absorbers, lubricants, processing aids, antistatic agents, colorants, impact resistance aids, fillers, matting agents, flame retardants (e.g. zinc borate) and the like. When present, the amount of additive can be at least 0.1, 0.2, 0.3, 0.4, or 0.5 wt-% and it typically no greater than 25, 20, 15, 10 or 5 wt-% of the total composition and film.

In some embodiments, the compositions are free of plasticizer, tackifier and combinations thereof. In other embodiments, the film and composition comprise plasticizer, tackifier and combinations thereof in amount no greater than 5, 4, 3, 2, or 1 wt-% of the total composition. From the standpoint of tensile strength, it is preferable not to add a large amount of tackifier or plasticizer.

In some embodiments, the composition comprises fumed silica. Fumed silica, also known as pyrogenic silica, is made from flame pyrolysis of silicon tetrachloride or from quartz sand vaporized in a 3000° C. electric arc. Fumed silica consists of microscopic droplets of amorphous silica fused into (e.g. branched) three-dimensional primary particles that aggregate into larger particles. Since the aggregates do not typically break down, the average particle size of fumed silica is the average particle size of the aggregates. Fumed silica is commercially available from various global producers including Evonik, under the trade designation "Aerosil," Cabot under the trade designation "Cab-O-Sil," and Wacker Chemie-Dow Corning. The BET surface area of suitable fumed silica is typically at least 50 m$^2$/g, or 75 m$^2$/g, or 100 m$^2$/g. In some embodiments, the BET surface area of the fumed silica is no greater than 400 m$^2$/g, or 350 m$^2$/g, or 300 m$^2$/g, or 275 m$^2$/g, or 250 m$^2$/g. The fumed silica aggregates preferably comprise silica having a primary particle size no greater than 20 nm or 15 nm. The aggregate particle size is substantially larger than the primary particle size and is typically at least 100 nm or greater.

The concentration of (e.g. fumed) silica can vary. In some embodiments, the composition comprises at least 0.5 or 1.0 wt-% of (e.g. fumed) silica.

In some embodiments, the film and composition comprise colorants such as pigments and dyes such as titania and carbon black. The concentration of such pigments and dyes can range up to about 20 wt-% of the total composition.

The inclusion of inorganic oxides such as (e.g. fumed) silica and titania can increase the tensile strength of the film and composition.

The film and (e.g. radiation) cured composition can be characterized using various techniques. Although the Tg of a copolymer may be estimated by use of the Fox equation, based on the Tgs of the constituent monomers and the weight percent thereof, the Fox equation does not take into effect interactions, such as incompatibility, that can cause the Tg to deviate from the calculated Tg. The Tg of the film and composition described refers to the midpoint Tg as measured by Differential Scanning calorimetry, (DSC), according to the test method described in the examples. When the film and (e.g. radiation) cured composition comprises a monomer having a Tg greater than 150° C., the upper limit of the DSC testing temperature is chosen to be higher than that of the highest Tg monomer. The Tg of the film and (e.g. radiation) cured composition generally ranges from 30° C. to 55, 56, 57, 58, 59, or 60° C. Thus, with respect to Tg, the film and (e.g. radiation) cured composition can be characterized as hard and glassy at room temperature (e.g. 25° C.), yet can be flexible. In some favored embodiments, the Tg of the film and (e.g. radiation) cured composition is at least 31, 32, 33, 34, or 35° C. In other embodiments, the Tg of the film and (e.g. radiation) cured composition is at least 36, 37, 38, 39, or 40° C. In yet other embodiments, the Tg of the film and (e.g. radiation) cured composition is at least 41, 42, 43, 44, or 45° C. The film and (e.g. radiation) cured composition preferably exhibits a single Tg as measured by DSC. Thus, the polymerized (meth)acrylic polymer and polyvinyl acetal polymer composition alone or in combination with crosslinker can exhibit a single Tg. The midpoint Tg as measured by DSC of the film and (e.g. radiation) cured compositions described herein is 10-12° C. lower than the peak temperature Tg as measured by Dynamic Mechanical Analysis (DMA) at a frequency of 10 Hz and a rate of 3° C./min. Thus, a Tg of 60° C. as measured according to DSC is equivalent to 70-72° C. when measured according to DMA as just described.

A single Tg is one indication of a single (e.g. continuous) phase morphology. Thus, the film, as well as the polymerized (meth)acrylic polymer and polyvinyl acetal polymer composition alone or in combination with crosslinker can be characterized as a single (e.g. continuous) phase. Alternatively, the film or (e.g. radiation) cured composition can be tested by transmission electron microscopy (TEM) according to the test method described in the examples. Single (e.g. continuous) phase morphology is preferred for films having low haze and high transmission.

In other embodiments, the film, as well as the polymerized (meth)acrylic polymer and polyvinyl acetal polymer composition alone or in combination with crosslinker can be characterized as having a dispersed phase of polyvinyl acetal (e.g. butyral) in a continuous phase of (meth)acrylic polymer. The average dispersion size can be calculated by averaging the diameter of randomly chosen particles (e.g. 100 particles) of the dispersed phase utilizing TEM. The average dispersion size can range from 0.1 to 10 microns. In some embodiments, the average dispersion size is less than 0.5, 0.3, 0.4, 0.3, 0.1 microns. An average dispersion size of less than 0.1 micron can also provide films having a low haze and high transmission.

The film and (e.g. radiation) cured composition can be characterized by tensile and elongation according to the test method described in the examples. In favored embodiments, the tensile strength is at least 10, 11, 12, 13, 14 or 15 MPa and typically no greater than 50, 45, 40, or 35 MPa. The elongation at break can ranges from 2, 3, 4 or 5% up to about 150%, 200% or 300% and greater. In some embodiments, the elongation is at least 50, 100, 150, or 175% and may range up to 225, 250, 275, or 300%. In some embodiments, the conformability as determined by % tensile set of the film and (e.g. radiation) cured composition is at least 20, 25, or 30%. In some embodiments, the film is suitable for use as a replacement for polyvinyl chloride film.

The film and (e.g. radiation) cured compositions are preferably non-tacky to the touch at room temperature (25° C.) and preferably at (e.g. storage or shipping) temperatures ranging up to (120° F.) 50° C. In some embodiments, the films may exhibit a low level of adhesion to glass. For example, the 180° peel values can be about 2 oz/inch or less at a 12 inch/minute peel rate.

The "Dahlquist Criterion for Tack" is widely recognized as a necessary condition of a pressure sensitive adhesives (PSA). It states that a PSA has a shear storage modulus (G') of less than $3 \times 10^6$ dyne/cm$^2$ (0.3 MPa) at approximately room temperature (25° C.) and a frequency of 1 Hz (Pocius, Adhesion and Adhesive Technology 3rd Ed., 2012, p. 288).

A shear storage modulus can be converted to a tensile storage modulus using the following equation: $E'=2G'(r+1)$, where r is Poisson's ratio for the relevant material. Using this equation and given that Poisson's ratio of elastomers and PSAs is close to 0.5, the Dahlquist Criterion expressed as a tensile storage modulus (E') is less than 0.9 MPa ($9 \times 10^6$ dyne/cm$^2$).

The film and (e.g. radiation) cured compositions described herein generally have a tensile storage modulus (E') at 25° C. of greater than $9 \times 10^6$ dynes/cm$^2$ at 1 Hz as can be measured by dynamic mechanical analysis (as determined by the test method described in the examples). The tensile storage modulus (E') at 25° C. is usually greater than $1 \times 10^7$ dynes/cm$^2$ (MPa), $5 \times 10^7$ dynes/cm$^2$, $1 \times 10^8$ dynes/cm$^2$, $5 \times 10^8$ dynes/cm$^2$, $1 \times 10^9$ dynes/cm$^2$, $5 \times 10^9$ dynes/cm$^2$, or $1 \times 10^{10}$ dynes/cm$^2$ (i.e. 1000 MPa) at 1 Hz. Thus, the film and composition is not a pressure sensitive adhesive in accordance with the Dahlquist criteria.

Herein, "(meth)acryloyl" is inclusive of (meth)acrylate and (meth)acrylamide.

Herein, "(meth)acrylic" includes both methacrylic and acrylic.

Herein, "(meth)acrylate" includes both methacrylate and acrylate.

The term "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

The term heteroalkyl refers to an alkyl group, as just defined, having at least one catenary carbon atom (i.e. in-chain) replaced by a catenary heteroatom such as O, S, or N.

"Renewable resource" refers to a natural resource that can be replenished within a 100 year time frame. The resource may be replenished naturally or via agricultural techniques. The renewable resource is typically a plant (i.e. any of various photosynthetic organisms that includes all land plants, inclusive of trees), organisms of Protista such as seaweed and algae, animals, and fish. They may be naturally occurring, hybrids, or genetically engineered organisms. Natural resources such as crude oil, coal, and peat which take longer than 100 years to form are not considered to be renewable resources.

When a group is present more than once in a formula described herein, each group is "independently" selected unless specified otherwise.

The invention includes but is not limited to the following embodiments:

Embodiment 1 is a film comprising (meth)acrylic polymer and polyvinyl acetal resin comprising polymerized units having the following formula

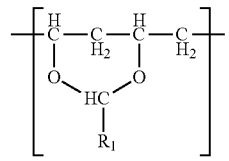

wherein $R_1$ is hydrogen or a C1-C7 alkyl group;
wherein the film has a Tg ranging from 30° C. to 60° C.

Embodiment 2 is a film comprising (meth)acrylic polymer and polyvinyl acetal resin comprising polymerized units having the following formula

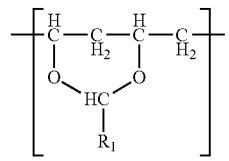

wherein $R_1$ is hydrogen or a C1-C7 alkyl group;
wherein the film has a gel content of at least 20%.

Embodiment 3 is the film of embodiment 2 wherein the film has a Tg ranging from 30° C. to 60° C.

Embodiment 4 is a film comprising:
(meth)acrylic polymer and polyvinyl acetal resin comprising polymerized units having the following formula

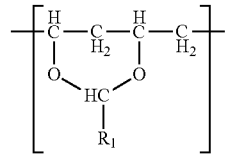

wherein $R_1$ is hydrogen or a C1-C7 alkyl group;

wherein the film has an elongation at break of at least 175%, a tensile set of at least 30%, or a combination thereof.

Embodiment 5 is the film of embodiment 4 wherein the film has a gel content of at least 20%.

Embodiment 6 is the film of embodiment 4 and/or 5 wherein the film has a Tg ranging from 30° C. to 60° C.

Embodiment 7 is a method of making a film comprising:
a) providing a composition comprising
  i) polyvinyl acetal resin comprising polymerized units having the following formula

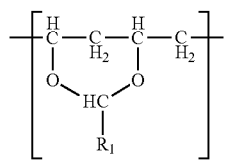

wherein $R_1$ is hydrogen or a C1-C7 alkyl group; and
  ii) free-radically polymerizable solvent monomer comprising alkyl(meth)acrylate monomer;
b) applying the composition to a substrate; and
c) polymerizing the solvent monomer and optionally crosslinking the composition thereby forming a composition wherein the composition is characterized by a Tg ranging from 30° C. to 60° C., a gel content of at least 20%, and elongation of at least 175%, or a combination thereof.

Embodiment 8 is a composition comprising a (meth)acrylic polymer and polyvinyl acetal resin comprising polymerized units having the following formula

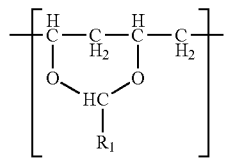

wherein $R_1$ is hydrogen or a C1-C7 alkyl group;
wherein the composition is characterized by a Tg ranging from 30° C. to 60° C., a gel content of at least 20%, and elongation of at least 175%, or a combination thereof.

Embodiment 9 is any of the previous embodiments wherein the film, polymerized composition of the method, or composition comprises at least 10, 15, 20 or 25 wt-% of polymerized units of monofunctional alkyl (meth)acrylate monomer having a Tg of less than 0° C.

Embodiment 10 is any of the previous embodiments wherein the film, polymerized composition of the method, or composition comprises no greater than 60 wt-% of polymerized units of monofunctional alkyl (meth)acrylate monomer having a Tg of less than 0° C.

Embodiment 11 is embodiment 9 and/or 10 wherein the monofunctional alkyl (meth)acrylate monomer has a Tg of less than −10° C., −20° C., −30° C., or −40° C.

Embodiment 12 is any of the previous embodiments wherein the film, polymerized composition of the method, or composition comprises a bio-based content of at least 10, 15, 20 or 25% of the total carbon content.

Embodiment 13 is any of the previous embodiments wherein the film, polymerized composition of the method, or composition comprises polymerized units of an alkyl (meth)acrylate monomer having an alkyl group with 8 carbon atoms.

Embodiment 14 is any of the previous embodiments wherein the film, polymerized composition of the method, or composition comprises up to 35 wt-% of polymerized units of a monofunctional alkyl (meth)acrylate monomer having a Tg greater than 40° C., 50° C., 60° C., 70° C., or 80° C.

Embodiment 15 is any of the previous embodiments wherein the film, polymerized composition of the method, or composition comprises at least 10, 15 or 20 wt-% and no greater than 65 wt-% of polymerized units of polar monomers.

Embodiment 16 is embodiment 15 wherein the polar monomers are selected from acid-functional, hydroxyl functional monomers, nitrogen-containing monomers, and combinations thereof.

Embodiment 17 is any of the previous embodiments wherein the polyvinyl acetal resin comprises polyvinyl butyral.

Embodiment 18 is any of the previous embodiments wherein the film, (e.g. polymerized) composition of the method, or composition comprises 5 to 30 wt-% of polyvinyl acetal resin.

Embodiment 19 is any of the previous embodiments wherein the polyvinyl acetal resin has a polyvinyl alcohol content ranging from 10 to 30.

Embodiment 20 is any of the previous embodiments wherein the polyvinyl acetal resin has a glass transition temperature ranging from 60° C. to 75° C.

Embodiment 21 is any of the previous embodiments wherein the polyacetal resin has an average molecular weight (Mw) ranging from 20,000 g/mole to 75,000 g/mole.

Embodiment 22 is any of the previous embodiments wherein the film, polymerized and crosslinked composition of the method, or composition comprises polymerized units of a multifunctional crosslinker wherein the crosslinker comprises functional groups selected from (meth)acrylate, alkenyl, and hydroxyl-reactive groups.

Embodiment 23 is any of the previous embodiments wherein the film, composition of the method, or composition further comprises additives in an amount no greater than 25 wt-%.

Embodiment 24 is any of the previous embodiments wherein the film, composition of the method, or composition comprises photoinitiator.

Embodiment 25 is any of the previous embodiments wherein the film, polymerized composition of the method, or composition comprises no greater than 10 wt-% of polymerized units of methacrylate monomers.

Embodiment 26 is any of the previous embodiments wherein the (meth)acrylic polymer is a random copolymer.

Embodiment 27 is any of the previous film embodiments wherein the film is a monolithic film.

Embodiment 28 is any of the previous film embodiments wherein the film is a film layer of a multilayer film.

Embodiment 29 is the multilayer film of Embodiment 28 further comprising a second film layer, the second film layer comprising a (meth)acrylic polymer and polyvinyl acetal resin wherein the second film layer has a Tg of less than 30° C.

Embodiment 30 is the multilayer film of Embodiment 28 wherein the second film layer is heat bondable.

Objects and advantages of this invention are further illustrated by the following examples. The particular materials and amounts, as well as other conditions and details, recited in these examples should not be used to unduly limit this invention.

TABLE 1

Materials

| Abbreviation | Description |
|---|---|
| PVB B60H | Poly(vinyl butyral), available from Kuraray, Houston, TX, under the trade designation "MOWITAL B60H" (Tg = 70° C.) |

Low Tg Monomers

| | |
|---|---|
| 2-OA (Tg = −45° C.) | 2-Octyl acrylate, Prepared according to Preparatory Example 1 of U.S. Pat. No. 7,385,020 |
| 2-EHA (Tg = −50° C.) | 2-Ethylhexyl acrylate, available from BASF, Florham Park, NJ |
| IOA (Tg = −70° C.) | Iso-octyl acrylate, obtained from 3M Company, St. Paul, MN. |

High Tg Monomers

| | |
|---|---|
| AA (Tg = 106° C.) | Acrylic acid, available from BASF, Florham Park, NJ. |
| CD 9055 (Tg = <30° C.) | acid acrylate, available from Sartomer, Exton, PA, under the trade designation "CD 9055" |
| IBOA (Tg = 94° C.) | Isobornyl acrylate, available from San Esters, New York, NY |
| NNDMA (Tg = 89° C.) | N,N-Dimethyl Acrylamide, available from TCI America, Montgomeryville, PA |
| NVP (Tg = 54° C.) | N-vinylpyrrolidone, available from TCI America, Montgomeryville, PA |
| HEA (Tg = 4° C.) | 2-Hydroxyl ethyl acrylate, available from BASF |

Crosslinkers

| | |
|---|---|
| HDDA | 1,6-Hexanediol diacrylate, available from Allnex, USA |
| DPA | Dicyclopentadienyl acrylate, available from Monomer-Polymer Laboratories, Philadelphia, PA |
| CN963B80 | An aliphatic polyester based urethane diacrylate oligomer blended with 20% SR238, hexane diol diacrylate available from Sartomer, Exton, PA, under the trade designation "CN 963 B80" |
| CN965 | An aliphatic, polyester based urethane diacrylate oligomer available from Sartomer, Exton, PA, under the trade designation "CN 965" |
| DESMODUR ™ XP 2617 | An NCO prepolymer based on hexamethylene diisocyanate, available from Bayer MaterialScience, Pittsburgh, PA, under the trade designation "DESMODUR XP 2617" |
| DESMODUR ™ N3600 | Trifunctional crosslinker based on hexamethylene diisocyanate, available from Bayer Material Science, Pittsburgh, PA, under the trade designation "DESMODUR N3600" |
| DESMODUR ™ VP LS 2371 | A polyether prepolymer based on isophorone diisocyanate available from Bayer Material Science, Pittsburgh, PA, under the trade designation "DESMODUR XP2371" |

Other Components

| | |
|---|---|
| H15 silica | Fumed silica, available from Wacker, under the trade designation "WACKER H15" |
| PARAPLEX A-8600 Plasticizer | Polymeric ester plasticizer, available from Hallstar, Chicago, IL, under the trade designation "PARAPLEX A-8600" |
| Carbon black Pigment | Carbon black, available from Birla Carbon under the trade designation "RAVEN 14 CARBON BLACK" |
| TiO₂ Pigment | Titanium dioxide, available from Kronus, Inc., Dallas, TX |
| Zinc borate Flame Retardant | Zinc borate, available from Rio Tinto. |
| IRG 651 | Initiator, available from BASF, Florham Park, NJ, under the trade designation "IRGACURE 651" |
| IRG 819 | Initiator, available from BASF, Florham Park, NJ, under the trade designation "IRGACURE 819" |

Test Methods

Tensile Strength and Elongation Test

Tensile and elongation testing was conducted according to ASTM D882-10 (unless specified otherwise) utilizing an INSTRON MODEL 4500 UNIVERSAL TESTING SYSTEM with a 1 kN load cell. Testing was performed at a rate of 300 mm/minute (11.81 inches/minute) for a total distance of 250 mm (9.84 inches). Samples were tested at least 24 hours after being prepared. A 0.5" (~1.3 cm) wide strip of film was cut, and the thickness was determined for each sample using a micrometer. Typical sample length was 5-7 cm (2-3 inches). Test results were reported as the average of 3-5 sample replicates. The tensile strength (nominal) and percent elongation at break were determined, as described by 11.3 and 11.5 of ASTM D882-10.

Differential Scanning calorimetry (DSC)

Approximately 5 mg of each of the film samples were placed in individual standard aluminum DSC pans (Thermal Analysis T080715) and placed in the autosampler of a differential scanning calorimeter (TA DSC Q200, TA Instruments). For each sample analysis, pans were individually placed on one of the differential posts in the calorimeter's enclosed cell, along with an empty reference pan on the opposite post. The temperature was raised to 150° C., cooled to −50° C., and reheated a second time to +150° C., at rates of 5° C./min. The second heating cycle was used to determine the Tg, referring to the midpoint temperature, described as $T_{mg}$ in ASTM D3418-12.

Gel Content

Aluminum pans were weighed and the weights (W1) were recorded. Mesh baskets were placed in pans and then weighed (basket and pan) and the weights (W2) were recorded. One inch (2.54 centimeter) diameter adhesive samples were placed into the baskets, and the samples (pan, basket, and adhesive sample) were weighed again (W3) and recorded. Samples (baskets and adhesive sample) were then placed in glass jars, covered with tetrahydrofuran, and left for three days. Then, the samples (basket and adhesive sample) were removed from tetrahydrofuran, and placed back into pans. Samples (pan, basket, and adhesive samples) were placed in an oven at 120° C. for 2 hours. Samples were removed from the oven and allowed to cool. Subsequently, samples were weighed and the weights (W4) were recorded. % Gel content=100(W4−W2)/(W3−W2).

Conformability

Conformability was evaluated using a tensile set test method according to ASTM D412-6a$^{e2}$: "Standard Test Methods for Vulcanized Rubber and Thermoplastic Elastomers—Tension" as follows. Test specimens having a width of 2.54 cm (1 inch) and a length of 10.2 cm (4 inches) were employed. The initial jaw separation distance on the film test specimen (50.8 mm) was marked, then the specimen was stretched at a rate of was 304.8 mm/minute (12 inches/minute) to 50% greater than its original length (76.2 mm) and held for 30 seconds. The test specimen was then released from the jaw grips and after 24 hours (or other specified duration of time) the length between the original marks was remeasured. Conformability, as measured by percent tensile set, was calculated as:

$$\% \text{ Tensile Set}=[(L24-L0)/(L1-L0)]\times 100$$

where L24 is the measured length after 24 (or other specified duration of time) hours, L0 is the initial jaw separation distance, and L1 is the 50% extended length. A tensile set value of 100% corresponds to zero elastic recovery. A film having such a value will remain in a stretched position without contracting.

Acrylic Polymer Control Examples

Control Example A and B were made by charging a quart jar with 2-OA, IBOA, and AA or NNDMA as indicated in Table 2. The monomer mixture was degassed at −20 inches of mercury (−6.8 kPa) for 5 minutes and purged with nitrogen for 5-10 minutes then exposed to low intensity UV A light radiation (less than 10 mW/cm², referred to as UV A because the output is primarily between 320 and 390 nm with a peak emission at around 350 nm which is in the UV A spectral region) until a coatable prepolymer syrup was prepared.

0.09 wt-% of IRG 651 photoinitiator and 0.02 wt-% of HDDA crosslinker was added to the coatable prepolymer syrup of Control Example A. 0.21 wt-% of IRG 651 photoinitiator was added to the coatable prepolymer syrup of Control Example B.

Control Examples A and B were coated at a thickness ranging from about 1.5 to 12 mils between untreated PET liners and under a nitrogen atmosphere cured by further exposure to UVA light. The total energy was measured using a Powermap™ radiometer equipped with a low intensity sensing head (available from EIT Inc., Sterling, Va.) and was 1824 mJ/cm² for each of these control samples.

The concentration of the monomers in the cured Control Examples A and B were as follows:

TABLE 2

|  | 2-OA | IBOA | AA | HDDA |
|---|---|---|---|---|
| Control Example A | 39.94% | 54.92% | 4.99% | 0.02% |

|  | 2-OA | IBOA | NNDMA |
|---|---|---|---|
| Control Example B | 44.89% | 24.94% | 29.93% |

Examples 1-13

Mixtures of monomers, PVB polymer, and other components were added to quart jars. The jars and contents were placed in a MAX 20 WHITE SPEEDMIXER (available from FleckTek, Inc., Landrum, S.C.) and mixed at 3500 RPM for 1 minute. The mixture was degassed at −20 inches of mercury (−6.8 kPa) for 5 minutes.

IRG 651 photoinitiator in an amount ranging from about 0.15 to 0.25 wt-% was added. The mixtures of Examples 1-13 were coated at a thickness ranging from about 1.5 to 12 mils between untreated PET liners and under a nitrogen atmosphere cured by exposure to a UV-A light source having a UV-A maximum in the range of 350-400 nm for 228 seconds. The total energy was measured using a Powermap™ radiometer equipped with a low intensity sensing head (available from EIT Inc., Sterling, Va.) and was 1824 mJ/cm² for each of these examples.

The wt-% of each type of polymerized unit in the cured films for each of the examples is reported in Tables 4A and 4B. The wt-% of polymerized units is slightly less than 100%. This difference is the photoinitiator content. Although the photoinitiator is present in the film, the concentration can be less than the amount initially added. When the film contained an additive, the amount of polymerized components in combination with the additive totaled 100%. Thus, Ex. 6 contained 14.48 wt-% of TiO$_2$ and 85.52 wt-% of polymerized components. Of the 85.52 wt-% of polymerized components, 30.96 wt-% was 2-EHA. The polymerized components (excluding the additive) contained the wt-% of monomer, PVB polymer, and crosslinker set forth in Tables 4A and 4B.

Preparation of Control C

An acrylic polymer was formed by UV polymerizing the components of the following Table 3:

TABLE 3

| 2-EHA | IBOA | NVP | AA |
|---|---|---|---|
| 48 | 13.3 | 32 | 6.5 |

The acrylic polymer was then fed into a twin screw extruder, which was heated to 204° C. MOWITAL B60H was fed into the extruder at 20% by weight relative to the weight of the acrylic polymer. The polymer mixture was extruded onto an untreated PET liner using a drop die. The wt-% of the polymerized units of Control C is set forth in Table 4B.

TABLE 4A

Wt.-% of Polymerized Units in Film Composition

| Ex. | Low Tg Monomer | High Tg Monomer IBOA | Nitrogen Polar Monomer | Polar Monomer | PVB B60H | Crosslinker | *Additive |
|---|---|---|---|---|---|---|---|
| 1 | 2-OA 35.91 | 19.95 | NNDMA 23.94 |  | 20 |  |  |
| 2 | 2-OA 35.93 | 19.96 | NNDMA 23.95 |  | 19.96 |  | H15 silica 1.06 |
| 3 | 2-OA 33.03 | 18.36 | NNDMA 22.05 | CD9055 5.59 | 18.35 | CN963B80 2.39 | Paraplex A8600 0.60 |
| 4 | 2-OA 34.95 | 19.43 | NNDMA 23.33 | CD9055 0.11 | 19.42 | CN963B80 2.53 | Zinc Borate 4.82 |
| 5 | 2-EHA 30.08 | 8.32 |  | AA 18.62 HEA 21.01 | 16.64 | CN963B80 2.64 Desmodur XP2617 2.53 |  |
| 6 | 2-EHA 30.96 | 8.57 |  | AA 16.29 HEA 21.63 | 17.13 | CN963B80 2.71 Desmodur XP2617 2.54 | TiO$_2$ 14.48 |

TABLE 4B

| Ex. | Low Tg Monomer | High Tg Monomer IBOA | Nitrogen Polar Monomer | Polar Monomer | PVB B60H | Crosslinker | Additive |
|---|---|---|---|---|---|---|---|
| 7 | 2-EHA 30.84 | 8.53 | | AA 16.31 HEA 21.55 | 17.07 | CN963B80 2.70 Desmodur XP2617 2.84 | Carbon Black 0.84 |
| 8 | 2-EHA 31.55 | 8.73 | | AA 17.29 HEA 22.04 | 17.46 | CN963B80 2.77 | |
| 9 | 2-EHA 20.3 | 2.8 | NVP 13.6 | AA 10.2 HEA 22.0 | 13.6 | CN963B80 2.0 Desmodur XP2371 15.6 | $TiO_2$ 11.5 |
| 10 | 2-EHA 20.3 | 2.8 | NVP 13.6 | AA 10.2 HEA 22.0 | 13.6 | CN963B80 2.0 Desmodur N3600 15.6 | $TiO_2$ 11.5 |
| 11 | 2-EHA 36.9 | 10.2 | | AA 4.2 HEA 25.8 | 13.6 | DPA 2.9 | |
| 12 | 24 | 32 | | AA 10 HEA 10 | 16.8 | 7.0 CN965 | 0.2 Irganox 651 |
| 13 | 2-EHA 37.5 | 10.4 | NVP 25 | | 20.8 | 6.0 C93B80 | 0.2 Irganox 651 |
| Control C | 2-EHA 38.40 | 10.64 | NVP 25.60 | AA 5.20 | 20.00 | | |

Control F was a 50/50 mixture by weight of 50,000 g/mole molecular weight polymethylmethacrylate and PVB (B60H).

Control G was a 50/50 mixture by weight of 350,000 g/mole molecular weight polymethylmethacrylate and PVB (B60H).

The films were subjected to DSC as well as Tensile Strength and Elongation at Break testing, as previously described. The results are reported in Table 5.

TABLE 5

| Example | Tg (° C.) | Tensile Strength (MPa) | Elongation at Break | % Gel Content |
|---|---|---|---|---|
| Control A (no PVB) | 26.9 | 12.3 | 186% | NM |
| Control B (no PVB) | 17.5 | 11.0 | 300% | NM |
| 1 | 38.9 | 19.4 | 299% | 71 |
| 2 | 42.9 | 20.7 | 175% | NM |
| 3 | 36.6 | 19.8 | 179% | NM |
| 4 | 35 | 18.3 | 176% | 84 |
| 5 | 35.4 | 24.4 | 159% | NM |
| 6 | 38 | 21.5 | 152% | 95 |
| 7 | 30.5 | 12.0 | 156% | NM |
| 8 | 36.5 | 34.3 | 205% | 95 |
| 9 | 49 | 19.7 | 172% | 93 |
| 10 | 57.9 | 38.9 | 7% | 95 |
| 11 | 53.5 | 27.6 | 200% | 94 |
| 12 | 41.9 | 30.3 | 210% | 85 |
| 13 | 51.9 | 25.3 | 211 | 37.5 |
| Control C | 29.3 | 3.6 | 55% | NM |
| Control F | NM | NM | NM | 4.0 |
| Control G | NM | NM | NM | 0 |

NM—Not Measured

Example 7 was analyzed by Dynamic Mechanical Analysis (DMA) using a DMAQ800 from TA Instruments in tensile mode to characterize the physical properties of each sample as a function of temperature. Rectangular samples, 6.2 mm wide and 0.05-0.07 mm thick, were clamped into the film tension clamps of the instrument at 17-19 mm length. The furnace was closed and the temperature was equilibrated at −50° C. and held for 5 minute. The temperature was then ramped from −50° C. to 50° C. at 3° C./min while the sample was oscillated at a frequency of 10 Hertz and a constant strain of 0.1 percent. While many physical parameters of the material were recorded during the temperature ramp, tensile storage modulus (E') at 25° C. was recorded as 1770 MPa (i.e. $1.77 \times 10^{10}$ dynes/cm$^2$).

The conformability of Example 12 was evaluated using the previously described tensile set test method. The % tensile set was 31.5%.

Multilayer Films

A multilayer film, Example 14, was prepared having two layers. The first layer was the same composition as Example 12 and had a thickness of 3 mils. The second layer was a (heat bondable) composition having a thickness of 3.5 mils having the following composition.

| IOA | AA | B60H H | Irg 651 | DPA |
|---|---|---|---|---|
| 79.2% | 8.8% | 8.8% | 0.3% | 2.9% |

The second layer was coated and on the cured first layer. Both film layers were cured with UVA light in the same manner as previously described. The multilayer film was subjected to the same tests previously described. The test results were as follows:

Tensile Strength: 3200 psi
Elongation at Break: 210%
Youngs Modulus: 81,500 psi (555 MPa)
Tg of cured (heat bondable) second film layer=−32.6° C.

Tg of cured first film layer=41.9° C.

The morphology, transmission, haze, and clarity of some representative film examples were evaluated using the following test methods. The test results are reported in Table 6 below.

Transmission, Haze and Clarity were measured using a BYK Haze-gard plus, CAT #4725.

Morphology Characterization by Transmission Electron Microscopy (TEM)

Analytical characterization of the sample morphology was carried out by transmission electron microscopy (TEM). All the film samples were imaged in cross-section.

Sample Preparation

The film samples were prepared using room-temperature ultramicrotomy as follows: 1) roughly ¼" by ½" sections were cut from the film samples using a scalpel blade. These sections were embedded in Scotchcast #5 electrical resin. The embedded samples were allowed to room-temperature cure overnight; 2) thin slices of the embedded film (in cross-section) were cut by ultramicrotomy (Leica FC7) using a diamond knife. Slice thickness varied from 110 nm to 150 nm, depending on the sample. Cutting speed was 0.15 mm/sec; 3) the thin slices were floated onto distilled/deionized water, and then collected onto a standard TEM sample grid: A carbon/formvar film supported on a 3 mm diameter, 150 mesh Cu grid.

Imaging

The prepared thin sections were imaged by TEM (FEI Osiris, 200 kv field emission TEM). Magnification range was from 450× to 20,000× (instrument magnification). Various imaging modes were employed to characterize the morphology. They are briefly described below:

TEM: Conventional Transmission Electron Microscopy is a microscopy technique in which a beam of electrons is transmitted through an ultra-thin specimen, in this case 110-150 nm, interacting with the specimen as it is transmitted through. An image is formed as a result of the electron/sample interactions. At the lower magnifications used here, TEM image contrast is primarily due to the variations in the thickness, structure and composition in the material.

STEM: Scanning Transmission Electron Microscopy. An alternate mode of imaging in the TEM: In this case the electron beam is rastered in much the same way as in an SEM image, but with a significantly smaller probe size. Probe size for this imaging mode ranges from 0.5 nm to 5 nm.

HAADF: High Angle Annular Dark Field imaging mode. HAADF images are formed by collecting the scattered (vs. transmitted) electrons with an annular dark-field detector. The high angle, incoherently scattered electrons which form the image are highly sensitive to variations in the average atomic number, thus the contrast in these images is compositionally sensitive. The HAADF imaging mode is also known as Z-contrast imaging.

TABLE 6

| Example | Transmission | Haze | Clarity | Morphology by TEM Analysis |
|---|---|---|---|---|
| Control A | 94.6 | 11.1 | 91.6 | Single phase |
| 8 | 94.6 | 8.17 | 90.4 | Single phase |
| 11 | 94.6 | 2.39 | 94.5 | Single phase |

What is claimed is:

1. A film comprising:
(meth)acrylic polymer comprising polymerized units of polar monomer and polyvinyl acetal resin comprising polymerized units having the following formula

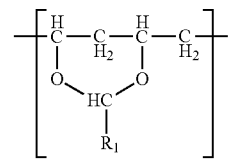

wherein $R_1$ is hydrogen or a C1-C7 alkyl group;
wherein the film has a single Tg ranging from 30° C. to 60° C. and a gel content of at least 20%.

2. The film of claim 1 wherein the film comprises at least 10 wt-% of polymerized units of monofunctional alkyl (meth)acrylate monomer having a Tg of less than 0° C.

3. The film of claim 2 wherein the film comprises no greater than 60 wt-% of polymerized units of monofunctional alkyl (meth)acrylate monomer having a Tg of less than 0° C.

4. The film of claim 2 or 3 wherein the monofunctional alkyl (meth)acrylate monomer has a Tg of less than −10° C.

5. The film of claim 1 wherein the film comprises polymerized units of an alkyl (meth)acrylate monomer having an alkyl group with 8 carbon atoms.

6. The film of claim 1 wherein the film further comprises up to 35 wt-% of polymerized units of a monofunctional alkyl (meth)acrylate monomer having a Tg greater than 40° C.

7. The film of claim 1 wherein the film comprises at least 10 wt-% and no greater than 65 wt-% of polymerized units of polar monomers.

8. The film of claim 7 wherein polar monomers are selected from acid-functional, hydroxyl functional monomers, nitrogen-containing monomers, and combinations thereof.

9. The film of claim 1 wherein the film comprises polyvinyl butyral.

10. The film of claim 1 wherein the film comprises 5 to 30 wt-% of polyvinyl acetal resin.

11. The film of claim 1 wherein the polyvinyl acetal resin has a glass transition temperature ranging from 60° C. to 75° C.

12. The film of claim 1 wherein the polyvinyl acetal resin has an average molecular weight (Mw) ranging from 20,000 g/mole to 75,000 g/mole.

13. The film of claim 1 wherein the film further comprises polymerized units of a multifunctional crosslinker wherein the crosslinker comprises functional groups selected from (meth)acrylate, alkenyl, and hydroxyl-reactive groups.

14. The film of claim 1 wherein the film further comprises additives including inorganic filler in an amount no greater than 25 wt-%.

15. The film composition of claim 1 wherein the film comprises photoinitiator.

16. The film composition of claim 1 wherein the film comprises no greater than 10 wt-% of polymerized units of methacrylate monomers.

17. The film composition of claim 1 wherein the (meth)acrylic polymer is a random copolymer.

18. The film of claim 1 wherein the film is a monolithic film or a film layer of a multilayer film.

19. The film of claim 18 wherein the multilayer film further comprises a second film layer, the second film layer comprising a (meth)acrylic polymer and polyvinyl acetal resin wherein the second film layer has a Tg of less than 30° C.

20. The film of claim 1 wherein the film has an elongation at break of at least 175%.

* * * * *